United States Patent
Liu

(10) Patent No.: US 9,003,219 B2
(45) Date of Patent: Apr. 7, 2015

(54) METHOD AND APPARATUS FOR MOBILE TERMINAL POWER MANAGEMENT

(75) Inventor: Bo Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 13/616,998

(22) Filed: Sep. 14, 2012

(65) Prior Publication Data

US 2013/0067263 A1 Mar. 14, 2013

Related U.S. Application Data

(63) Continuation of application No. PCT/CN2011/079597, filed on Sep. 14, 2011.

(51) Int. Cl.
*G06F 1/00* (2006.01)
*G06F 1/32* (2006.01)
*H04W 52/02* (2009.01)

(52) U.S. Cl.
CPC ............ *G06F 1/3212* (2013.01); *G06F 1/3206* (2013.01); *H04W 52/0225* (2013.01)

(58) Field of Classification Search
CPC ........... G06F 1/26; G06F 1/32; G06F 1/3206; G06F 1/3212; H04W 52/02
USPC ............................ 713/300, 320, 340; 455/574
See application file for complete search history.

(56) References Cited

U.S. PATENT DOCUMENTS

| 6,345,180 | B1 * | 2/2002 | Reichelt | 455/404.1 |
| 7,440,751 | B2 * | 10/2008 | Boros | 455/418 |
| 7,945,797 | B2 * | 5/2011 | Matton et al. | 713/324 |
| 8,032,317 | B2 * | 10/2011 | Houston et al. | 702/62 |
| 8,122,272 | B2 * | 2/2012 | Finkelstein et al. | 713/324 |

(Continued)

FOREIGN PATENT DOCUMENTS

| CN | 1774100 A | 5/2006 |
| CN | 1909694 A | 2/2007 |

(Continued)

OTHER PUBLICATIONS

1st Office Action in corresponding Chinese Patent Application No. 201180002242.9 (Jul. 30, 2012).

(Continued)

*Primary Examiner* — Chun Cao
(74) *Attorney, Agent, or Firm* — Leydig, Voit & Mayer, Ltd.

(57) ABSTRACT

A method and apparatus for mobile terminal power management is provided in this invention, which belongs to communication field. The method comprises: obtaining a reserving condition and power consumption per unit time of an application requiring power reservation, the reserving condition comprising a reserving time; according to the reserving condition and the power consumption per unit time, calculating an amount of power required to be reserved for the application; and reserving power for the application according to the amount of power required to be reserved for the application. The apparatus comprises: an obtaining module, a calculation module, and a power reservation module. Through calculating an amount of power required to be reserved during a reserving period of time for the application requiring power reservation, this invention can guarantee the use of an important application or application of priority as selected by a user.

15 Claims, 5 Drawing Sheets

(56) References Cited

U.S. PATENT DOCUMENTS

| | | | | |
|---|---|---|---|---|
| 8,594,648 | B2* | 11/2013 | Musial et al. | 455/418 |
| 8,615,225 | B2* | 12/2013 | Musial et al. | 455/418 |
| 2002/0177475 | A1* | 11/2002 | Park | 455/574 |
| 2005/0248317 | A1* | 11/2005 | Yang | 320/132 |
| 2007/0121536 | A1* | 5/2007 | Aihara | 370/318 |
| 2008/0052545 | A1 | 2/2008 | Finkelstein et al. | |
| 2008/0165714 | A1* | 7/2008 | Dettinger et al. | 370/311 |
| 2010/0151918 | A1* | 6/2010 | Annambhotla et al. | 455/573 |
| 2011/0071780 | A1* | 3/2011 | Tarkoma | 702/63 |
| 2011/0083025 | A1* | 4/2011 | Lee | 713/320 |
| 2012/0210150 | A1* | 8/2012 | de Lind van Wijngaarden et al. | 713/320 |

FOREIGN PATENT DOCUMENTS

| | | |
|---|---|---|
| CN | 101009394 A | 8/2007 |
| CN | 101202555 A | 6/2008 |
| JP | 2006129302 A | 5/2006 |

OTHER PUBLICATIONS

International Search Report in corresponding International Patent Application No. PCT/CN2011/079597 (Jun. 28, 2012).

$2^{nd}$ Office Action in corresponding Chinese Patent Application No. 201180002242.9 (Apr. 3, 2013).

* cited by examiner

METHOD AND APPARATUS FOR MOBILE TERMINAL POWER MANAGEMENT

CROSS-REFERENCE TO RELATED APPLICATIONS

This application is a continuation of International Patent Application No. PCT/CN2011/079597, filed on Sep. 14, 2011, which is hereby incorporated by reference in its entirety.

TECHNICAL FIELD OF THE APPLICATION

The present invention relates to the communication field, and more specifically, to a method and apparatus for mobile terminal power management.

BACKGROUND

Mobile terminal refers to computer device used in mobile environment, comprising smart phone, portable computer, etc, which are generally provided with a plurality of application functions, such as phone call, music, game, reader, camera, and the like, making our life and work very continent. Mobile terminals are commonly powered by rechargeable batteries due to their mobility requirement. Since mobile terminals might not be charged in time whenever their batteries have insufficient power, power management components are generally provided for mobile terminals to prompt user to use of battery power reasonably.

The existing power management component generally has the following functions: monitoring the current remaining power of its battery and indicating it to user on a screen; turning off the mobile terminal system when the power reaches a threshold; providing power saving settings for user, etc.

In the implementation of this invention, at least the following problems have been found by the inventors:

Since a plurality of application functions of a mobile terminal are aggregated on a single device, a resource competing phenomenon may occur between various application functions. However, existing power management components only have functions of power prompt and automatically turning off a mobile terminal system. In practical operation, user often suffers from a low power state of the mobile terminal due to the use of various entertaining applications, which may then disturbs the use of important functions, such as phone call, and thus brings inconvenience or even troubles to the user.

SUMMARY APPLICATION

In order to address the problem in the prior art of unable to guarantee the use of important application functions of a mobile terminal, a method and apparatus for mobile terminal power management is provided in the embodiments of this invention. The technical solutions are as follows.

On one aspect, a method for mobile terminal power management is provided in an embodiment of this invention, comprising:

obtaining a reserving condition and power consumption per unit time of an application requiring power reservation, the reserving condition comprising a reserving time;

according to the reserving condition and the power consumption per unit time, calculating an amount of power required to be reserved for the application; and reserving power for the application according to the amount of power required to be reserved for the application.

On another aspect, an apparatus for mobile terminal power management is provided in an embodiment of this invention, comprising:

an obtaining module for obtaining a reserving condition and power consumption per unit time of an application requiring power reservation, the reserving condition comprising a reserving time;

a calculation module for calculating an amount of power required to be reserved for the application according to the reserving condition and the power consumption per unit time obtained by the obtaining module; and a power reservation module for reserving power for the application according to the amount of power required to be reserved for the application calculated by the calculating module.

The technical solutions of the embodiments of this invention have the following beneficial effects: through calculating an amount of power required to be reserved during a reserving period of time for an application requiring power reservation, and reserving power for the application according to the power amount, the use of an important application or application of priority selected by a user can be guaranteed.

BRIEF DESCRIPTION OF THE DRAWINGS

For a more explicit description of the technical solutions of embodiments of this invention, a brief introduction of accompanying drawings to be used in the description of these embodiments will be given below. Obviously, accompanying drawings described below are merely some embodiments of this invention, for those skilled in the art, other accompanying drawings can be derived from these ones without any creative efforts.

DETAILED DESCRIPTION

For a better clarity of objects, technical solutions, and advantages of this invention, a further detailed description of embodiments of this invention will be given below in connection with the accompanying drawings.

The mobile terminal in the embodiments of this invention refers to a computer device which can be used in mobile environments, comprising but not limited to: a smart phone, a PDA and a portable computer. The applications in the embodiments of this invention comprise but not limited to: phone call, camera, music, game, reader, office application and other applications.

Embodiment 1

Figure 1:
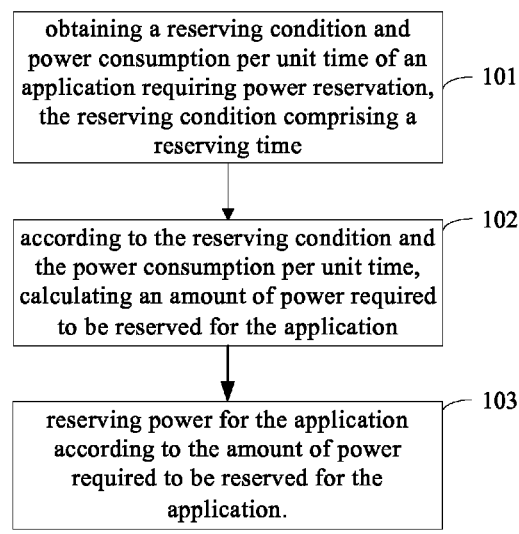
FIG. 1 is a flowchart of a method for mobile terminal power management provided in Embodiment 1 of this invention.

Referring to FIG. 1, a method for mobile terminal power management is provided in an embodiment of this invention, comprising:

Step 101: obtaining a reserving condition and power consumption per unit time of an application requiring power reservation, the reserving condition comprising a reserving time;

Step 102: calculating an amount of power required to be reserved for the application according to the reserving condition and the power consumption per unit time;

Step 103: reserving power for the application according to the amount of power required to be reserved for the application.

The embodiment of this invention may guarantee the use of an important application or application of priority selected by a user through calculating power required to be reserved during a reserving period of time for the application requiring power reservation, and reserving the power according to the calculated power.

Embodiment 2

In this embodiment, a method for mobile terminal power management of this embodiment will be described with a smart phone as an example. For the convenience of the understanding of this embodiment, first, a brief introduction of the structure of the smart phone will be given below.

A smart phone generally comprises a hardware portion and a software portion, wherein the hardware portion is mainly composed of hardware modules with different functions, such as a BP (Baseband Processor) module, an AP (application Processor) module, a display module, and a battery module, etc. Each hardware module is connected with each other through standard interface and interconnection bus to form a complete hardware system of the mobile terminal. The software portion mainly comprises an operation system, an application framework and environment, and applications. The operation system manages various hardware modules through underlying driver programs of corresponding hardware modules, and provides an abstract hardware and execution environment for upper level applications. All underlying hardware modules can be managed through the operation system, for example, by turning off, turning on a hardware module, or setting it to enter power saving mode. The operation system can also read status of managed hardware modules, such as current CPU operating frequency, temperature, etc. The application framework and environment provide a window execution environment for window application, a widget execution environment for widget application, etc. The upper level applications particularly comprise voice call application, self-configuration management, browser, video camera/camera application, E-book application, electronic map and navigation application, widget application and so on.

Figure 2:
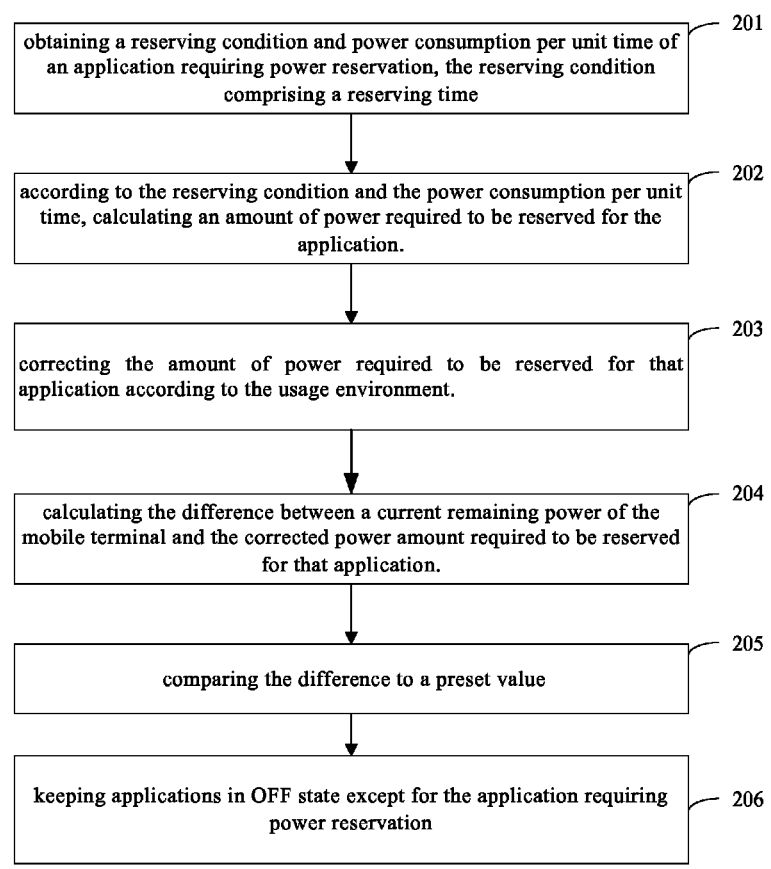
FIG. 2 is a flowchart of a method for mobile terminal power management provided in Embodiment 2 of this invention.

Referring to FIG. 2, a method for mobile terminal power management is provided in an embodiment of this invention, comprising:

201: obtaining a reserving condition and power consumption per unit time of an application requiring power reservation, the reserving condition comprising a reserving time.

Furthermore, the reserving time in the reserving condition described above is obtained according to a user setting. Particularly, the reserving time can be set as a range of time, such as 08:00~23:00; or it can be set to a specified period of time, such as 8 h, from the time of starting the setting operation by default.

Preferably, the reserving condition can further comprise a usage mode and/or usage environment. Furthermore, usage modes can be classified according to the traffic of the mobile terminal. In this embodiment, comprising high load, low load and normal load; usage environment can be classified according to network environment, comprising factors such as network status, temperature, brightness, etc. In this embodiment, usage environment can comprise poor, good and normal environments. It is easy to recognize that both usage mode and usage environment can be classified into even more levels.

Particularly, the usage mode and the usage environment can be obtained according to a user setting, and the usage environment also can be obtained according to the network status of the mobile terminal during a predetermined period of time. Furthermore, the usage environment can be estimated through detecting and collecting statistics on network environments where the mobile terminal locates in previous 12 or 24 hours. For example, if it has been detected and determined, based on the statistics, that the mobile terminal is located in a poor environment for 6 hours of the previous 12 hours, then the mobile terminal can automatically select its usage environment as poor (see Table 1).

Furthermore, the power consumption per unit time is obtained according to a preset value of power consumption per unit time of the application. Particularly, power consumption model can be pre-configured in a mobile terminal for each application, which comprises power consumption per unit time under various reserving conditions (except for the reserving time) of each application. Table 1 shows a relatively complete power consumption model, which is merely an example and does not intend to limit the embodiments of this invention.

As shown in Table 1, in this embodiment, there are three usage modes: high load, low load, and normal load; and there are three usage environments: poor, good, and normal environment, wherein, the power consumption per unit time of each application corresponds to various usage modes, and each usage environment corresponds to corrected parameters of power consumption per unit time. Since the corrected parameter of power consumption per unit time is zero for normal environment, it is omitted from Table 1. The normal load and environment are set as default. When only reserving time is set by a user, the usage mode and the usage environment correspond to their default values, respectively.

TABLE 1

| Application name/power consumption per unit time (Erate)/average adjustment (Radj) | Power consumption under high load (mA · h/h) | Power consumption under low load (mA · h/h) | Power consumption under normal load (mA · h/h) | Increment in power consumption in poor environment (%) | Decrement in power consumption in good environment (%) | |
|---|---|---|---|---|---|---|
| Phone call | 60 | 20 | 30 | 20 | 10 | ... |
| camera | 100 | 10 | 20 | 50 | 15 | ... |
| ... | ... | ... | ... | ... | ... | ... |

Step 202, according to the reserving condition and the power consumption per unit time, calculating an amount of power required to be reserved for the application.

Particularly, this step can comprise the following steps in an example, wherein the application requiring power reservation is phone call, the reserving time is 08:00~23:00, and the usage mode is high load:

At a first step, power consumption per unit time Erate corresponding to the phone call application corresponding to high load is looked up in Table 1, which is 30 mA·h/h.

At a second step, an actual reserving time is calculated for the application according to a current time and the reserving time, wherein, the actual reserving time is represented by Hrev. For example, with a reserving time of 08:00~23:00, suppose the obtained current time is 12:00, then the actual reserving time Hrev is 23:30−12:00=11.5 h.

In the case where the reserving time is a specific value, such as a reserving time of 8 h for the telephone application, and a current time 15:00, then the actual reserving time Hrev of the application is 8−(15:00−12:00)=5 h.

At a third step, according to the power consumption per unit time and the actual reserving time of the application, an amount of power required to be reserved for that application is calculated. Particularly, Hrev*Erate=11.5*30=345 mA·h.

step 203: correcting the amount of power required to be reserved for that application according to the usage environment.

Particularly, as described above, in this embodiment, the use environment is poor, then the corrected amount of power Erev=Hrev*Erate*(1+Radj)=11.5*30*(1+20%)=414 mA·h.

Step 204: calculating the difference between a current remaining power of the mobile terminal and the corrected power amount required to be reserved for that application.

Step 205: comparing the difference to a preset value. If the difference is less than the preset value, then the process proceeds to step 206; if the difference is larger than the preset value, then no operation is executed and the process returns to step 202 after a predetermined period of time.

Optionally, the preset value can be power consumption of the application during a period of time, for example, 2 hours, or a constant value, for example, 50 mA·h. The preset value is a value which is set for a safety margin. Obviously, the preset value also can be set to 0, i.e., no safety margin is set.

If the difference between the current remaining power of the mobile terminal and the corrected amount of power required to be reserved for that application is less than 0, how long the application can be further supported is calculated based on the power consumption per unit time of the application and the current remaining power of the mobile terminal and displayed to users.

Step 206: keeping applications in OFF state, except for the application requiring power reservation, or keeping applications in OFF state, except for the application requiring power reservation, and turning off hardware modules that are not to be used by the application.

Furthermore, keeping applications in OFF state, except for the application requiring power reservation comprises: turning off applications in execution except for the application requiring power reservation, and disabling activation of new applications.

When applications in execution is turned off, except for the application requiring power reservation, and activation of new applications is disabled, users can be prompted that the power reservation function has been enabled for an application. Particularly, an icon on the display screen of the smart phone representing a remaining battery power can be substituted with another icon, such as a flicker icon, or an icon in another color, or an icon of remaining battery power with a background of the icon of the application.

It can be easily recognized that if another application is required by a user, then it can be realized by changing the set conditions.

Through calculating an amount of power required to be reserved during a reserving period of time for an application requiring power reservation, and reserving power for the application according to the power amount, the present embodiment of this invention can guarantee the use of an important application or application of priority as selected by a user. Furthermore, through presetting power consumption per unit time for each application, i.e. the power consumption models described above, calculation may be simplified.

Embodiment 3

Figure 3:
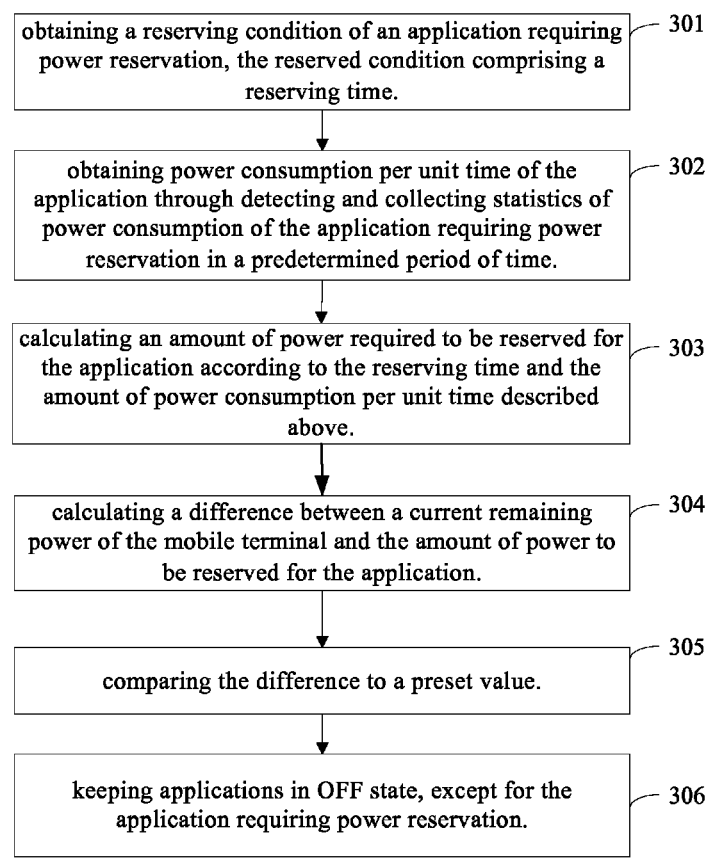
FIG. 3 is a flowchart of a method for mobile terminal power management provided in Embodiment 3 of this invention.

As shown in FIG. 3, a method for mobile terminal power management is provided in an embodiment of this invention, comprising:

Step 301: obtaining a reserving condition for an application requiring power reservation, the reserving condition comprising a reserving time.

Furthermore, the reserving time is obtained according to a user setting. Particularly, the reserving time can be set as a range of time, such as 08:00~23:00; or it can be set to a specified value, such as 8 h, from the time of starting the setting operation by default.

Step 302: obtaining the power consumption per unit time of the application through detecting and collecting statistics of the power consumption of the application requiring power reservation in a predetermined period of time.

Particularly, this step comprises:

Step A: detecting and collecting statistics of power consumption per unit time for hardware modules used by the application, respectively. Particularly, with the phone call application as an example, first of all, special hardware modules and common hardware modules of the application are determined. The special hardware modules refer to hardware modules in the mobile terminal that are exclusively used by the application, such as, the BP module only used in phone call application; the common hardware modules refer to those commonly used by multiple applications, such as storage module, display module, and the like. For common hardware modules, they can be further classified as time-division modules and shared modules. As to time-division modules, it can be detected whether power consumption will be reduced if other applications are disabled. The power consumption per unit time of hardware modules used in the application can be recorded in a form as shown in Table 2, Table 2 is merely an example and this invention is not limited thereto.

TABLE 2

| Hardware module | Property | Power consumption per unit time for phone call application (mA · h/h) |
|---|---|---|
| AP module | Common, time-division | 5 mA · h |
| BP module | special | 10 mA · h |
| Camera module | No use | / |
| Display module | Common, time-division | 5 mA · h |
| GPS module | No use | / |
| WiFi module | No use | / |
| Storage module | Common, shared | 2 mA · h |
| ... | ... | ... |

Wherein, as to a special hardware module, the power consumption per unit time of the module is measured and recorded periodically. As to a shared common hardware module, the power consumption per unit time of the module is measured and recorded periodically. As to a time-division common hardware module, only the power consumption per unit time of the hardware module when the application is executed is measured and recorded.

Step B: according to the power consumption per unit time of the hardware modules used by the application, calculating the power consumption per unit time of the application.

As shown in Table 2, the power consumption per unit time of the application is 5 mA·h+10 mA·h+5 mA·h+2 mA·h=22 mA·h.

Note that the method for detecting and collecting statistics can be further refined, for example, taking 10 min as a unit time to establish correspondence between time for collecting statistics and power consumption based on the statistics. Correspondingly, the method of calculating the power consumption per unit time of the application can be more complicated, and the detailed description of which will be omitted herein.

Step 303: calculating an amount of power required to be reserved for the application according to the reserving time and the power consumption per unit time described above.

This step is identical to step 202 of Embodiment 2, and thus its detailed description will be omitted herein. Obviously, the reserving condition of this embodiment can also comprise a usage environment, and correspondingly, the calculated amount of power to be reserved can be corrected according to the usage environment.

Step 304: calculating a difference between a current remaining power of the mobile terminal and the amount of power to be reserved for the application.

Step 305: comparing the difference with a preset value. If the difference is less or equal to the preset value, then the process proceeds to step 206, if the difference is larger than the preset value, then the process returns to step 202 without any operation after a preset period of time.

Optionally, the preset value can be the power consumption of the application during a period of time, for example, 2 hours, or can be a fixed value, for example, 50 mA·h. The preset value is a value set for safety margin. Obviously, the preset value also can be set to 0, i.e., no safety margin is set.

Step 206: keeping applications in OFF state except for the application requiring power reservation, or keeping applications in OFF state except for the application requiring power reservation, and turning off hardware modules that are not needed by the application.

Furthermore, keeping applications in OFF state, except for the application requiring power reservation comprises: turning off applications in execution, except for the application requiring power reservation, and disabling the activation of new applications.

When applications in execution are turned off except for the application requiring power reservation, and activation of new applications is disabled, users can be prompted that the power reservation function has been enabled for an application. Particularly, an icon on the display screen of the smart phone representing a remaining battery power can be substituted with another icon, such as a flicker icon, or an icon in another color, or an icon of remaining battery power with a background of the icon of the application.

Through calculating an amount of power required to be reserved during a reserving period of time for an application requiring power reservation, and reserving power for the application according to the power amount, the present embodiment of this invention can guarantee the use of an important application or application of priority as selected by a user. Further, through collecting statistics of the power consumption of hardware modules to be used by each application to obtain a more accurate power consumption per unit time corresponding to each application, the present embodiment of this invention can calculate the amount of power to be reserved in a reserving time more accurately.

Embodiment 4

Figure 4:
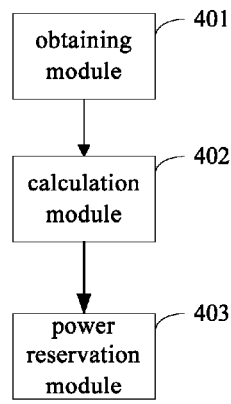
FIG. 4 is a structural block view of an apparatus for mobile terminal power management provided in Embodiment 4 of this invention.

Referring to FIG. 4, an apparatus for mobile terminal power management is provided in an embodiment of this invention, comprising:

an obtaining module 401, for obtaining a reserving condition and a power consumption per unit time of an application requiring power reservation, the reserving condition comprising a reserving time;

a calculation module 402, for calculating an amount of power required to be reserved for the application according to the reserving condition and the power consumption per unit time obtained by the obtaining module 401; and a power reservation module 403, for reserving power for the application according to the amount of power required to be reserved for the application calculated by the calculation module 402.

Through calculating an amount of power required to be reserved during a reserving period of time for an application requiring power reservation, and reserving power for the application according to the power amount, the present embodiment of this invention can guarantee the use of an important application or application of priority as selected by a user.

Embodiment 5

Figure 5:
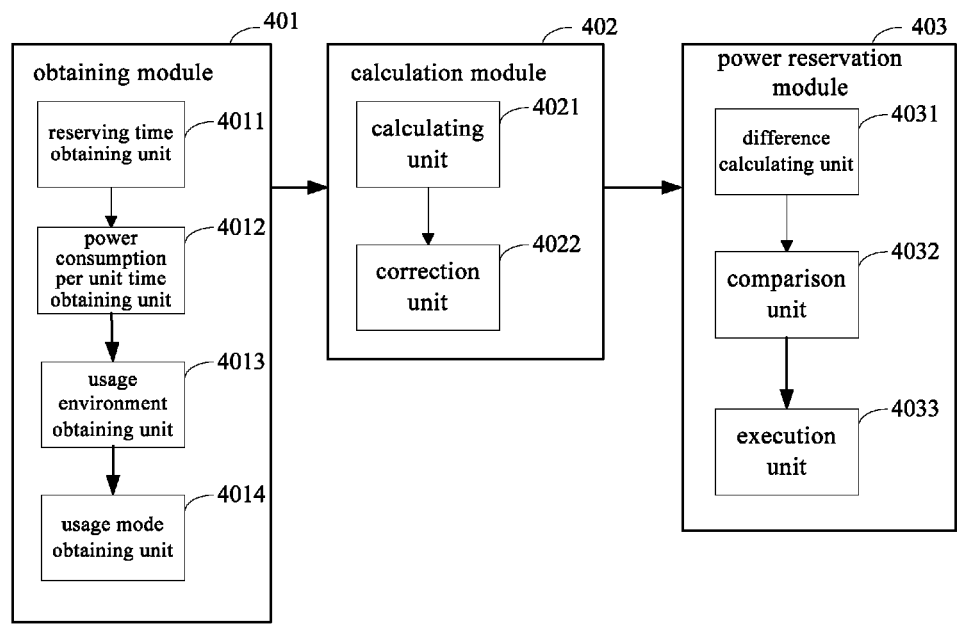
FIG. 5 is a structural block view of an apparatus for mobile terminal power management provided in Embodiment 5 of this invention.

Referring to FIG. 5, an apparatus for mobile terminal power management is provided in an embodiment of this invention, comprising:

an obtaining module 401, for obtaining a reserving condition and a power consumption per unit time of an application requiring power reservation, the reserving condition comprising a reserving time;

a calculation module 402, for calculating an amount of power required to be reserved for the application according to the reserving condition and the power consumption per unit time obtained by the obtaining module 401; and a power reservation module 403 for reserving power for the application according to the amount of power required to be reserved for the application calculated by the calculation module 402.

Furthermore, the obtaining module 401 comprises:

a reserving time obtaining unit 4011 for obtaining a reserving time of the application according to a user setting;

a power consumption per unit time obtaining unit 4012 for obtaining a power consumption per unit time of the application according to a preset value of the power consumption per unit time of the application or through detecting and collecting statistics of a power consumption of the application requiring power reservation in a predetermined period of time.

Preferably, the obtaining module 401 further comprises:

a usage environment obtaining unit 4013 for obtaining its usage environment according to a user setting or a network status of the mobile terminal in a predetermined period of time.

Preferably, the obtaining module 401 further comprises:

a usage mode obtaining unit 4014 for obtaining a usage mode according to a user setting.

Correspondingly, the power consumption per unit time obtained by the power consumption per unit time obtaining unit 4012 corresponds to the usage mode obtained by the usage mode obtaining unit 4014.

Furthermore, the calculation module 402 comprises:

a calculating unit 4021 for calculating an amount of power required to be reserved for the application according to the reserving time and the power consumption per unit time of the application requiring power reservation obtained by the obtaining module 401;

a correction unit 4022 for correcting the calculated amount of power required to be reserved for the application by the calculating unit 4021 according to the usage environment obtained by the usage environment obtaining unit 4014.

Furthermore, the power reservation module 403 comprises:

a difference calculating unit 4031 for calculating the difference between a current remaining power of the mobile terminal and the amount of power required to be reserved for the application;

a comparison unit 4032 for comparing the difference calculated by the difference calculating unit 4031 and a preset value;

an execution unit 4033 for keeping applications in OFF state, except for the application requiring power reservation when the comparison result of the comparison unit 4032 is less than or equal to the preset value, or keeping applications in OFF state, except for the application requiring power reservation and turning off hardware modules that are not to be used by the application.

Through calculating an amount of power required to be reserved during a reserving period of time for an application requiring power reservation, and reserving power for the application according to the power amount, the present embodiment of this invention can guarantee the use of an important application or application of priority as selected by a user. Furthermore, through presetting power consumption per unit time for each applications, i.e. the power consumption models described above, calculation can be simplified.

Embodiment 6

Figure 6:
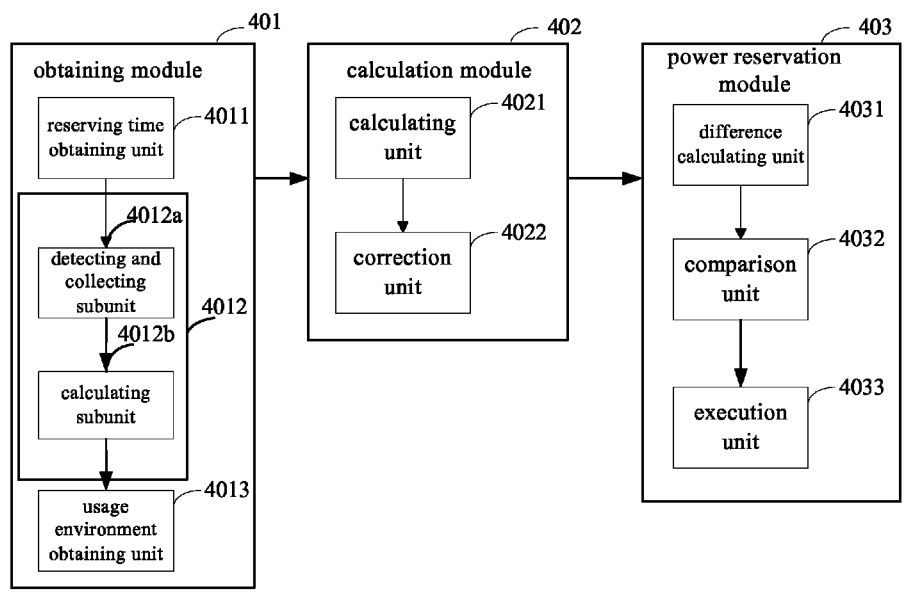
FIG. 6 is a structural block view of an apparatus for mobile terminal power management provided in Embodiment 6 of this invention.

As shown in FIG. 6, an apparatus for mobile terminal power management is provided in an embodiment of this invention. The apparatus of embodiment 6 differs from the apparatus of embodiment 5 in that the apparatus of embodiment 6 does not have the usage mode obtaining unit 4014, and the power consumption per unit time obtaining unit 4012 comprises:

a detecting and collecting subunit 4012a for detecting and collecting statistics of power consumption per unit time of hardware modules used in the application, respectively;

a calculating subunit 4012b for calculating the power consumption per unit time of the application according to the power consumption per unit time of hardware modules used by the application according to the statistics collected by the detecting and collecting subunit.

Through calculating an amount of power required to be reserved during a reserving period of time for an application requiring power reservation, and reserving power for the application according to the power amount, the present embodiment of this invention can guarantee the use of an important application or application of priority as selected by a user. Furthermore, through collecting statistics of power consumption of hardware modules used by each application to obtain more accurate power consumption per unit time corresponding to each application, the present embodiment of this invention can calculate the amount of power to be reserved in a reserving time more accurately.

The apparatus of embodiments 4, 5 and 6 are provided in a mobile terminal.

Note that in the power management of a mobile terminal performed by the apparatus for mobile terminal power management provided in the above embodiments, the partition of various functional modules described above is merely illustrative. In practice, the function described above can be assigned to different function modules, that is, the interior structure of the apparatus can be partitioned into different functional modules to achieve all or some of the functions described above. Furthermore, the apparatus for mobile terminal power management provided in the above embodiments belong to the same concept as the method embodiments of mobile terminal power management, the detailed implementation of which can be found in the method embodiments and will not be repeated herein.

Those ordinary skilled in the art can understand that all or some steps of the above embodiments can be implemented by hardware or by program instructing corresponding hardware, the program described above can be stored in a computer readable storage medium. The storage medium described above comprises: ROM, magnetic discs, or optical discs, and the like.

The description above is merely some preferable embodiments of this invention, and is not limitation of this invention. Any modifications, alternatives, or improvements that are made within the spirit and principle of this invention should be encompassed in the scope of this invention.

What is claimed is:

1. A method for mobile terminal power management, characterized in that the method comprises:
    obtaining a reserving condition and power consumption per unit time of an application requiring power reservation, the reserving condition comprising a reserving time;
    calculating an amount of power required to be reserved for the application according to the reserving condition and the power consumption per unit time; and
    reserving power for the application according to the amount of power required to be reserved for the application,
    wherein the calculating the amount of power comprises:
    calculating an actual reserving time for the application according to a current time and the reserving time, and
    calculating the amount of power required to be reserved for the application according to the actual reserving time for the application and the power consumption per unit time.

2. The method according to claim 1, characterized in that, obtaining a reserving condition and power consumption per unit time of an application requiring power reservation comprises:
    obtaining the reserving time of the application according to a user setting; and
    obtaining the power consumption per unit time of the application according to a preset value of the power consumption per unit time of the application or through detecting and collecting statistics of power consumption of the application in a predetermined period of time.

3. The method according to claim 2, characterized in that, obtaining the power consumption per unit time of the application through detecting and collecting statistics of power consumption of the application in a predetermined period of time comprises:

detecting and collecting statistics of power consumption per unit time of hardware modules used in the application, respectively;

calculating the power consumption per unit time of the application according to the power consumption per unit time of hardware modules used in the application.

4. The method according to claim 1, characterized in that, the reserving condition further comprises a usage mode, and then obtaining a reserving condition and power consumption per unit time of an application requiring power reservation further comprises:

obtaining the usage mode according to a user setting, and the power consumption per unit time corresponds to the usage mode.

5. The method according to claim 1, characterized in that, the reserving condition further comprises usage environment, and then obtaining a reserving condition and power consumption per unit time of an application requiring power reservation further comprises:

obtaining the usage environment according to a user setting or a network status of the mobile terminal in a predetermined period of time.

6. The method according to claim 5, characterized in that, calculating an amount of power required to be reserved for the application according to the reserving condition and the power consumption per unit time comprises:

calculating an amount of power required to be reserved for the application according to the reserving time and the power consumption per unit time of the application requiring power reservation;

correcting the amount of power required to be reserved for the application according to the usage environment.

7. The method according to claim 1, characterized in that, reserving power for the application according to the amount of power required to be reserved for the application comprises:

calculating the difference between a current remaining power of the mobile terminal and the amount of power required to be reserved for that application;

comparing the difference to a preset value, and if the difference is less than or equal to the preset value, then keeping applications in OFF state except for the application requiring power reservation, or keeping applications in OFF state except for the application requiring power reservation, and turning off hardware modules that are not to be used by the application.

8. An apparatus for mobile terminal power management, characterized in that the apparatus comprises:

an obtaining module for obtaining a reserving condition and power consumption per unit time of an application requiring power reservation, the reserving condition comprising a reserving time;

a calculation module for calculating an amount of power required to be reserved for the application according to the reserving condition and the power consumption per unit time; and a power reservation module for reserving power for the application according to the amount of power required to be reserved for the application, wherein the calculation module calculates an actual reserving time for the application according to a current time and the reserving time, and calculates the amount of power required to be reserved for the application according to the actual reserving time for the application and the power consumption per unit time.

9. The apparatus according to claim 8, characterized in that the obtaining module comprises:

a reserving time obtaining unit for obtaining a reserving time of the application according to a user setting;

power consumption per unit time obtaining unit for obtaining power consumption per unit time of the application according to a preset value of the power consumption per unit time of the application, or through detecting and collecting statistics of power consumption of the application requiring power reservation in a predetermined period of time.

10. The apparatus according to claim 9, characterized in that the power consumption per unit time obtaining unit comprises:

a detecting and collecting subunit for detecting and collecting statistics of power consumption per unit time of hardware modules used by the application, respectively;

a calculating subunit for calculating the power consumption per unit time of the application according to the power consumption per unit time of hardware modules used by the application based on the statistics collected by the detecting and collecting subunit.

11. The apparatus according to claim 9, characterized in that the obtaining module further comprises:

a usage mode obtaining unit for obtaining a usage mode according to a user setting;

wherein the power consumption per unit time of the application obtained by the power consumption per unit time obtaining unit corresponds to the usage mode obtained by the usage mode obtaining unit.

12. The apparatus according to claim 9, characterized in that the obtaining module further comprises:

a usage environment obtaining unit for obtaining a usage environment according to a user setting or a network status of the mobile terminal in a predetermined period of time.

13. The apparatus according to claim 12, characterized in that the calculation module comprises:

a calculating unit for calculating an amount of power required to be reserved for the application according to the reserving time and the power consumption per unit time of the application requiring power reservation obtained by the obtaining module;

a correction unit for correcting the calculated amount of power required to be reserved for the application by the calculating unit according to the usage environment obtained by the usage environment obtaining unit.

14. The apparatus according to claim 8, characterized in that the power reservation module comprises:

a difference calculating unit for calculating the difference between a current remaining power of the mobile terminal and the amount of power required to be reserved for the application;

a comparison unit for comparing the difference calculated by the difference calculating unit to a preset value;

an execution unit for keeping applications in OFF state, except for the application requiring power reservation when the comparison result of the comparison unit is less than or equal to the preset value, or keeping applications in OFF state, except for the application requiring power reservation, and turning off hardware modules that are not to be used by the application.

15. A method for mobile terminal power management, comprising:

obtaining, by a mobile terminal power management device, a reserving condition and power consumption per unit time of an application requiring power reservation, the reserving condition comprising a reserving time;

determining an amount of power required to be reserved for the application according to the reserving condition and the power consumption per unit time; and reserving power for the application according to the amount of power required to be reserved for the application, wherein the calculating the amount of power comprises:

determining an actual reserving time for the application according to a current time and the reserving time, and determining the amount of power required to be reserved for the application according to the actual reserving time for the application and the power consumption per unit time.

* * * * *